US006223257B1

(12) United States Patent
Cummins et al.

(10) Patent No.: US 6,223,257 B1
(45) Date of Patent: Apr. 24, 2001

(54) INSTRUCTION CACHE ADDRESS GENERATION TECHNIQUE HAVING REDUCED DELAYS IN FETCHING MISSED DATA

(75) Inventors: Sean P. Cummins, Sunnyvale; Kenneth K. Munson, Saratoga; Christopher I. W. Norrie, San Jose; Matthew D. Ornes, Sunnyvale, all of CA (US)

(73) Assignee: Rise Technology Company, Santa Clara, CA (US)

( * ) Notice: Subject to any disclaimer, the term of this patent is extended or adjusted under 35 U.S.C. 154(b) by 0 days.

(21) Appl. No.: 09/310,659

(22) Filed: May 12, 1999

(51) Int. Cl.⁷ .................................................. G06F 12/12
(52) U.S. Cl. .......................................... 711/137; 711/213
(58) Field of Search .................................. 711/118, 137, 711/138, 213, 219; 712/205, 207

(56) References Cited

U.S. PATENT DOCUMENTS

| 4,943,908 | 7/1990 | Emma et al. ......................... 364/200 |
| 5,287,487 | 2/1994 | Priem et al. .......................... 395/425 |
| 5,379,393 | * 1/1995 | Yang ..................................... 395/400 |
| 5,499,355 | 3/1996 | Krishnamohan et al. ........... 395/464 |
| 5,991,848 | * 11/1999 | Koh ......................................... 711/3 |
| 6,079,002 | * 6/2000 | Thatcher et al. ..................... 711/169 |
| 6,085,291 | * 7/2000 | Hichs et al. .......................... 711/137 |

OTHER PUBLICATIONS

Tabak, D., "Chapter 4—Memory Hierarchy," *Advanced Microprocessors*, Second Edition, pp. 43–65, (1995).

* cited by examiner

Primary Examiner—Kevin L. Ellis
(74) Attorney, Agent, or Firm—Oblon, Spivak, McClelland, Maier & Neustadt, P.C.

(57) ABSTRACT

A technique and system for reading instruction data from a cache memory with minimum delays. Addresses are calculated and applied to the cache memory in two or more cycles by a pipelined address generation circuit. While data at one address is being retrieved, the next address is being calculated. It is presumed, when calculating the next address, that the current address will return all the data it is addressing. In response to a miss signal received from the cache when no data at the current address is in the cache, the missed data is read from a main system memory and accessed with improved speed. In a system where the cache memory and processor operate at a higher clock frequency than the main system memory, new data is obtained from the main memory during only periodically occurring cache clock cycles. A missed cache memory address is regenerated in a manner to access such new data during the same cache clock cycle that it first becomes available from the main memory. This eliminates the occurrence of penalty delay cycles that reduce the rate at which instructions are issued in existing processors, and thus improves the speed of operation of the processors.

8 Claims, 5 Drawing Sheets

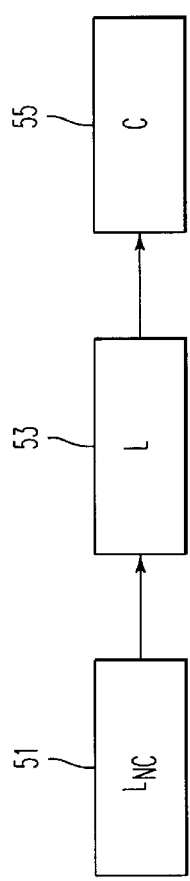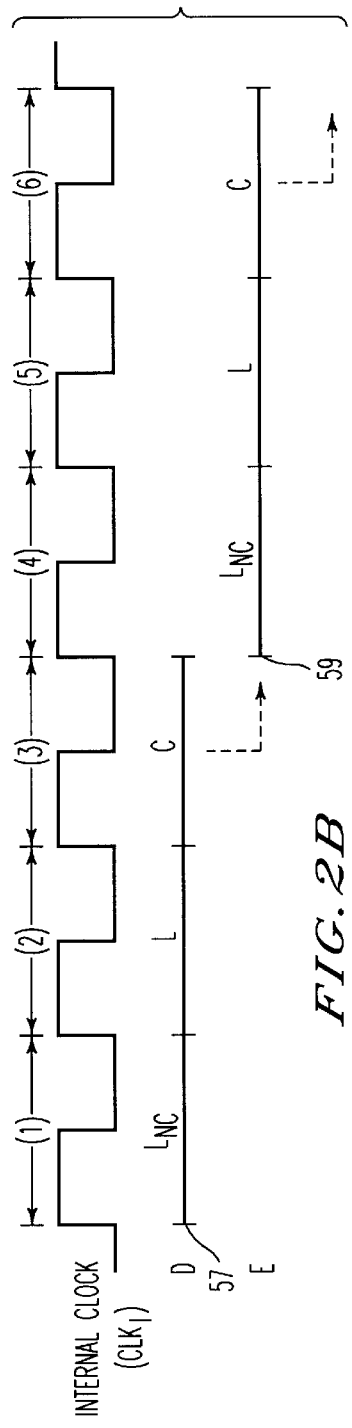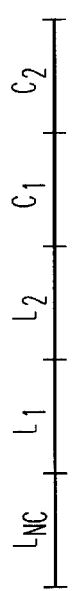

INSTRUCTION CACHE ADDRESS GENERATION TECHNIQUE HAVING REDUCED DELAYS IN FETCHING MISSED DATA

BACKGROUND OF THE INVENTION

This invention relates generally to the use of cache memories as part of data processors, and, more specifically, to techniques of generating addresses to fetch instruction data from a cache memory.

Cache memories are used in data processors of various designs to improve the speed with which frequently used data is accessed. A single cache is often utilized for both instruction and user data but separate instruction and data caches are more commonly used in high performance processors. Cache memory is typically integrated with a microprocessor on a single chip. The limited capacity cache memory of a processor is loaded from a main system memory as necessary to make the frequently used data available for fast access by the processor. If data at a particular memory address specified by the processor is not in the cache, a significant number of processing cycles is required to obtain the data from the main memory and either write it into the cache or provide it directly to the processor, or both.

Addresses of instruction data are typically generated in a pipeline having at least two stages, one to calculate an address in one operating cycle and the next to apply that calculated address to the cache in the next operating cycle. Also during the second operating cycle, any data in the cache at that address is typically read out and written to an instruction buffer, and a status signal is returned to indicate whether data is present at that address or not, in terms of a "hit" or "miss." If a miss, the cache accesses main memory to obtain the data at that address, typically resulting in a delay of many operating cycles before the data becomes available for writing into the instruction buffer. If a hit, it is desired to generate the next address as quickly as possible from the hit address plus the amount of data being returned from the cache at the hit address, preferably in the second operating cycle, in order to minimize the number of operating cycles required generate each address. However, it is difficult to resolve in the second cycle whether the current address has resulted in a hit or miss, in time to be used to generate the next address in the second cycle, resulting in either lengthening the duration of the cycles or waiting until the next cycle after the hit signal is returned in order to generate the next address. The performance of pipelined and other types of processors is adversely affected by such delays.

Therefore, it is a general object of the present invention to provide improved instruction fetch techniques that minimize the number of operating cycles required to address the cache and read instruction data from it.

It is a more specific object of the present invention to improve the speed at which instruction data at an address for which a miss signal is returned is accessed for use by the processor.

SUMMARY OF THE INVENTION

These and other objects are accomplished by the present invention, wherein, according to one aspect of the present invention, the individual addresses of instruction data are generated with the assumption that the full amount of data requested by prior address(es), but not yet returned, will be returned. If this prediction is correct, instruction data is fetched at a much faster rate than when it is first determined whether a particular address hits or misses before the next address is calculated. If incorrect, subsequent addresses calculated before the miss signal is returned from the cache are discarded and later recalculated but this penalty is no worse than in a system that always waits until a hit or miss signal is returned from one address before calculating the next address. The improved technique does not need to know whether a current address has resulted in a hit or not before the next address is calculated. So long as hits are being obtained, the new address is incremented by the amount of cache data that is read at one time, usually a full line. After a miss, however, in an architecture where the width of the bus to the main memory is less than the width of a line of cache data that is read at one time, each new address is preferably incremented for a time by the width of the main memory bus so that the instruction data missing from the cache is made available as soon as it is read from the main memory instead of waiting for a full line of missing cache data to be received.

According to another aspect of the present invention, in an architecture where the internal processor clock has a frequency that is higher than the frequency of the external clock, which is typical in high performance microprocessors, a missed cache address is subsequently regenerated in synchronism with the data first being made available from the main memory. It has been recognized that there are periodically recurring internal clock cycles where data from the main memory is first made available, either through the cache or directly from the main memory bypassing the cache, for writing into the instruction buffer. These internal clock cycles, referred to as "windows of opportunity," occur once during each external clock cycle, immediately after data is latched onto the system memory bus. By synchronizing the retrieval of instruction data in this way, delays of one or more internal clock cycles to obtain instruction data from the main memory, typical of existing data fetch techniques without such synchronization, are avoided. The result is improved processor performance.

Additional objects, aspects, features and advantages of the present invention are included in the following description of its preferred embodiments, which description should be taken in conjunction with the accompanying drawings.

BRIEF DESCRIPTION OF THE DRAWINGS

FIG. 2A illustrates an address generation pipeline included in the instruction fetch block of FIG. 1;

FIG. 2B illustrates, with respect to an internal clock signal, several address flows according to a typical operation of the address generation pipeline of FIG. 2A;

FIG. 5 illustrates a modified address flow occurring during operation of an address generation pipeline included in the instruction fetch block of FIG. 1.

DESCRIPTION OF THE PREFERRED EMBODIMENTS

Figure 1:
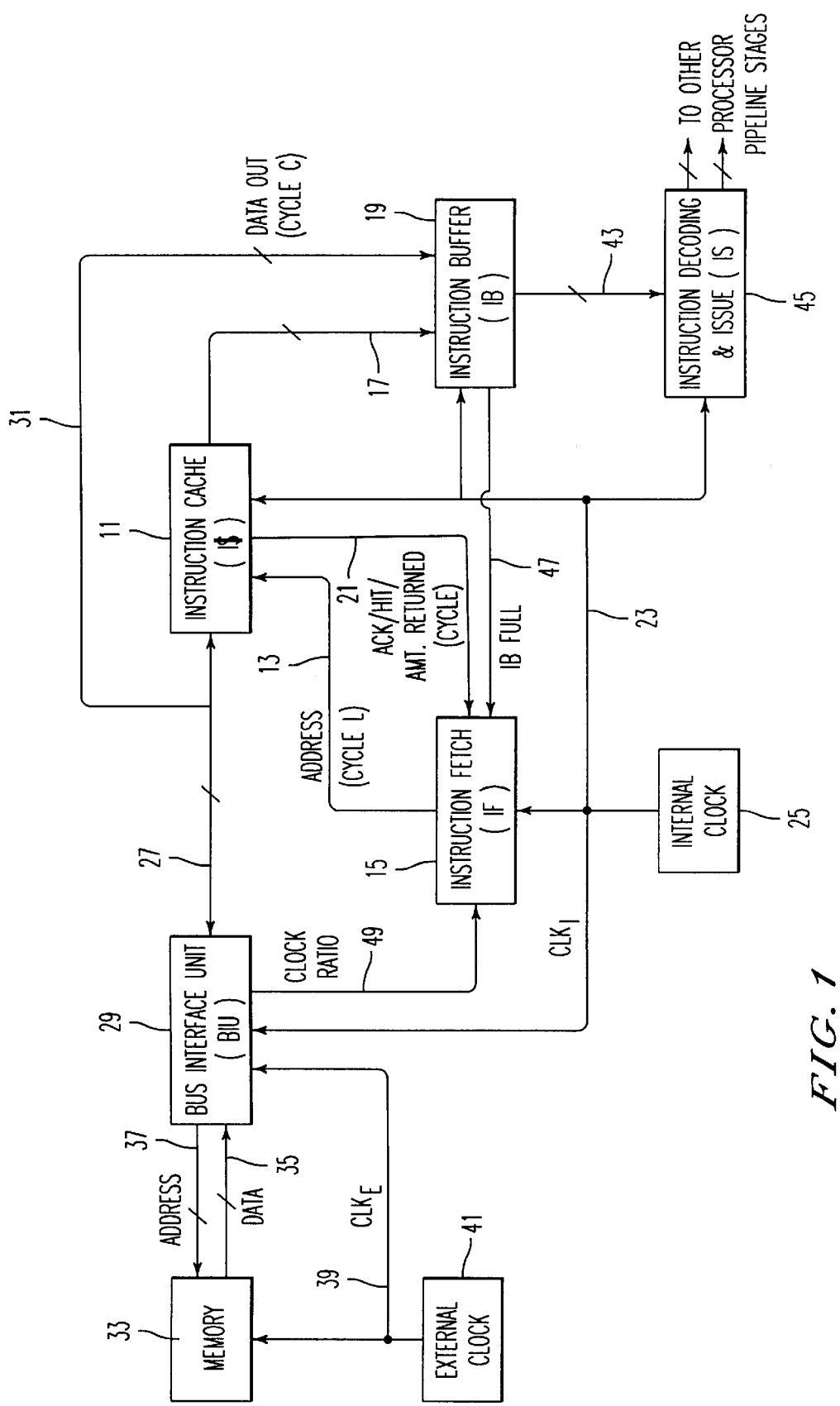
FIG. 1 shows in block diagram form a portion of a processor system including an instruction cache and associated circuits utilized to fetch instruction data from the cache.

Referring initially to FIG. 1, a cache memory 11 is used to store instruction data, preferably exclusively but the same cache may also be used to store user data. In response to an address received over lines 13 from an instruction fetch circuit 15, the data stored within the cache at that address is read out over lines 17 and stored in an instruction buffer 19. Also in response to an address presented in the lines 13, the cache 11 provides status signals in a line 21 that acknowledge receipt of the address, whether data is present ("hit") in the cache 11 at the specified address or not ("miss"), and, if data is present, the amount of data that is being returned by the lines 17 to the instruction buffer 19 from the address presented. The cache 11, as well as the instruction fetch unit 15 and the instruction buffer 19 are driven by an internal clock signal $CLK_I$ in a line 23 from a clock circuit 25.

Data is transferred into the cache 11 over lines 27 from a bus interface unit 29, which are, optionally, also extended by lines 31 directly to the instruction buffer 19 around the cache 11. This data bypass allows data by the instruction fetch circuit 15 that are not in the cache to retrieved from main memory for immediate use by the processor at the same time as it is being written into the cache 11. Main system memory 33 communicates with the bus interface unit 29 over data and address busses 35 and 37. The system memory 33 is driven by an external clock signal $CLK_E$ over a line 39 from a clock circuit 41. The main memory 33 and clock 41 are generally not part of the processor integrated circuit chip that contains the remaining components illustrated in FIG. 1. The main memory 33 typically includes semiconductor random access memory and magnetic disk storage, for example.

The instruction buffer 19 is a first-in, first-out ("FIFO") memory. Its data output is connected through lines 43 to a circuit 45 that separates its output stream of instruction data into individual instructions for use by remaining stages (not shown) of the processor. Typically, the processor is pipelined with individual instructions from the IS stage 45 being applied to an address generator as a next stage, the calculated address being applied to a data cache to obtain operands necessary to execute the instruction, its execution being carried out in a next stage, and a following stage writes the results of the instruction execution into a memory or register. The part of the processor shown in FIG. 1 is useful with a wide variety of types of processors, including those having a single multi-stage pipeline and those having two parallel pipelines that each receive instructions from the IS stage 45. The architecture of a superscaler processor having more than two parallel processor pipelines, in which the instruction fetch techniques of the present invention may be employed, is described in copending patent application Ser. No. 09/151,634, filed Sep. 11, 1998, by Kenneth K. Munson, entitled "Dynamic Allocation of Resources in Multiple Micro-Processor Pipelines", which application is incorporated herein in its entirety by this reference.

The instruction fetch circuits 15 has logic including a state machine that generates a succession of addresses in lines 13 in response to several input signals, including the previously described status signals from the cache 11 in the line 21, a signal in a line 47 that indicates when the instruction buffer 19 is full of instruction data, and a signal in a line 49 that provides a ratio of the frequency of the internal clock $CLK_I$ to that of the external clock $CLK_E$. Since the processor can usually operate internally at a much higher rate of speed than can the external circuits, the internal clock signal $CLK_I$ will usually have a frequency that is much higher than that of the external clock signal $CLK_E$. The clock frequencies are preferably chosen so that the ratio of $CLK_E$ to $CLK_I$ is an integer, best to be an even integer of 2, 4, or higher.

The address generating logic of the IF circuits 15 is preferably designed for parallel operation of steps necessary to calculate and present addresses to the cache 11. A three stage address generation pipeline is illustrated in FIG. 2A. A first $LN_C$ stage 51 includes a register storing the most recently generated address and logic that combines external signals such as a hit/miss status signal in the line 21 and an alignment address. The contents of the register and an output of the logic are combined with a adder that is part of a next L pipeline stage 53. In a third C stage 55, the address output of the adder is applied to the cache 11 to return data. The operations of each stage are preferably timed to take place within one internal clock cycle, so the pipeline generates an address in three successive internal clock cycles that can be identified as the $L_{NC}$, L and C cycles. Of course, different logical constructions of the pipeline are possible which operate in two or more than three internal clock cycles to generate a single address of instruction data for the cache 11.

Successive address generation flows are illustrated in FIG. 2B with respect to the internal clock signal $CLK_I$. In a first flow 57 that generates an address D, the address generation cycle $L_{NC}$ takes place during clock cycle (1), the cycle L during clock cycle (2) and the cycle C during clock cycle (3). It is typically only late in the C cycle that the hit/miss status signal can be returned by the cache 11. Thus, the $L_{NC}$ cycle of the next flow 59 occurs during the next clock cycle (4) after the hit/miss signal is received by the instruction fetch logic. If there was a hit from the first flow 57, the next sequential address E is calculated during the next flow 59. If, instead, there was a miss, the address D would typically be regenerated during the flow 59. In either case, another address generation flow would not begin until clock cycle (7), after it is known whether the second generated address hit or missed. It can thus be seen that a new line of data is read out of the cache 11 into the instruction buffer 19, at best when there are no misses, only once every 3 internal clock cycles. And if the address generation pipeline were to take more than 3 clock cycles to generate the address, which is a trend as the internal clock speeds increase, the number of clock cycles occurring between the reading of each new line of cache data resultantly increases.

Figure 3:
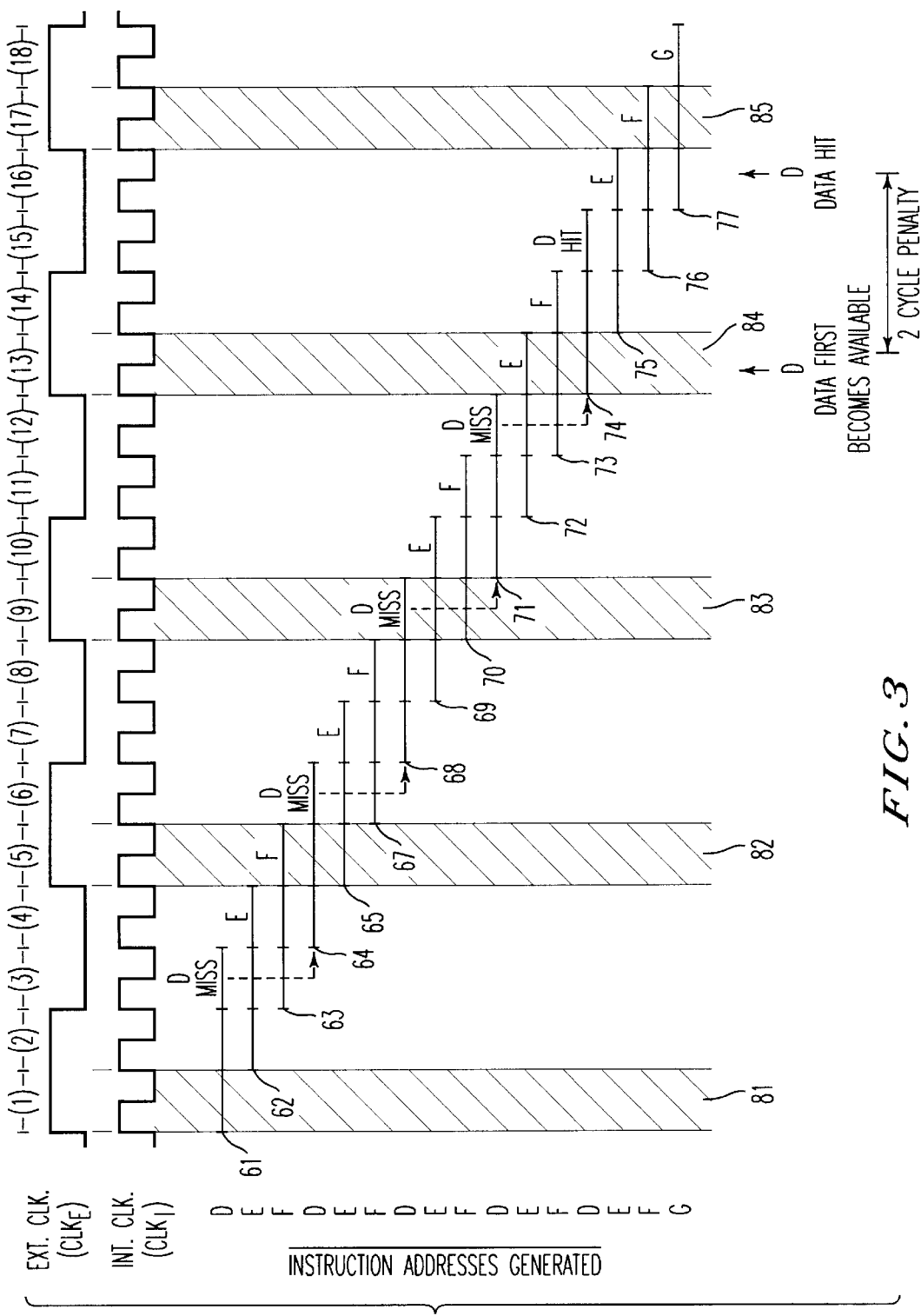
FIG. 3 is a timing diagram showing operation of one embodiment of address generation controlling logic of the instruction fetch block of FIG. 1.

One way to increase the rate at which lines of cache data are made available in the instruction buffer 19 is illustrated in FIG. 3, where a succession of address generation flows 61–77 are shown with respect to the internal and external clock signals. It is assumed, for this example, that the ratio of the frequencies of internal to external clock signals is four; that is, four cycles of $CLK_I$ occur during each cycle of $CLK_E$. Instead of waiting until the end of one flow before beginning another, as is the case in FIG. 2B, a new flow is begun during each clock cycle. The first flow 61 begins during clock cycle (1) and the next flow 62 during clock cycle (2). Since it is not known whether the address generated in the first flow 61 will hit or not when an address is being calculated during clock cycles (2) and (3) in the flow 62, it is assumed that all the data to be requested by the address D generated during the flow 61 will be returned by the cache 11. Thus, an address E is calculated during the flow 62 by adding the address range of the data requested by the preceding flow 61 to the previous address D. The same is done during the next flow 63 to generate an address F, and in every other successive address generation flow until there is a miss returned by the cache instead of data.

Rather than waiting until the hit/miss signal is received as the result of one flow before commencing to calculate the next address, successive addresses are calculated by making the predictive assumption that all the data addressed in the preceding flows will be hit. This breaks the direct coupling between the cache fetch result and the next and/or future cycle address generation. It increases the rate of data returned by up to a multiple equal to the length of the address generation pipeline in number of internal clock cycles, in this case three. But when misses occur, the delays in obtaining the missed data from the main system memory 33 are no worse that the usual delays of the address generation technique illustrated in FIG. 2B.

Indeed, the first flow 61 is shown in the example of FIG. 3 to result in a miss. The addresses E and F generated by the next two flows 62 and 63 have predicted that the address D would result in a hit. But by the clock cycle (4), when the flow 64 begins, it is known that the address D missed and this information is used by the address generation logic of the $L_{NC}$ pipeline stage to cause it to regenerate the missed address D. The addresses E and F generated by the flows 62 and 63 are discarded. The next flows 65 and 66 again predict that the address D will hit but in clock cycle (6), in this example, a miss signal for the address D from the flow 64 is again returned by the cache memory 11. This is because it normally takes several external clock cycles for the cache 11, in response to a miss, to access the main memory 33 and write the missed instruction data into the cache 11 or provide the missing data on the bypass 31. So the pattern of sequentially generating the D, E and F addresses continues until, because there is a hit of address D during internal clock cycle (15), the flow 77 generates the next address G and addresses E and F generated in the preceding flows 75 and 76 are used rather than being discarded.

It has been recognized as part of the present invention that delays in accessing missing data read from the main memory 33, in the system having an internal clock frequency higher than that of the external clock, can be reduced by recognizing the intervals when such data first becomes available and synchronizing the address generation with the these intervals. Such windows of opportunity 81–85 exist in the example of FIG. 3. In this example, data is returned from the main memory on the rising edge of each external clock cycle, so first becomes available to the instruction fetch operation during each internal clock cycle that begins at the same time. With the example clock ratio of 4:1, a window of opportunity occurs during every fourth internal clock cycle. The example of FIG. 3 shows the initially missed data at address D to first be available during the window 84, during internal clock cycle (13) but is not accessed for another two cycles, until cycle (15). That results in a penalty of up to a two cycle delay in reading the data at address D into the instruction buffer 19 for use by the processor. Statistically, it is expected that there will be an equal number of occurrences when there is no delay, when there is one cycle of delay and when the delay is two cycles. The result is a potential degradation of the performance of the processor.

One modification of the operation illustrated in FIG. 3 that will result in the address D being available at cycle C of the address generating pipeline when the data is first returned, is to repetitively generate the address D from the flow 64 onwards, after it is known that it missed the first time, rather than continue to increment to addresses E and F. The data is then accessed during the clock cycle (13) when it is first made available in the window 84. That is because the flow 72, as with all of the flows 64–71, have generated the address D, in this modified example. This does not eliminate the penalty, however, because the address E is generated only in the flow 75 that begins in the next clock cycle (14) and is not available until two cycles later, in clock cycle (16). By this modification of the FIG. 3 method, there is always a two cycle penalty.

Figure 4:
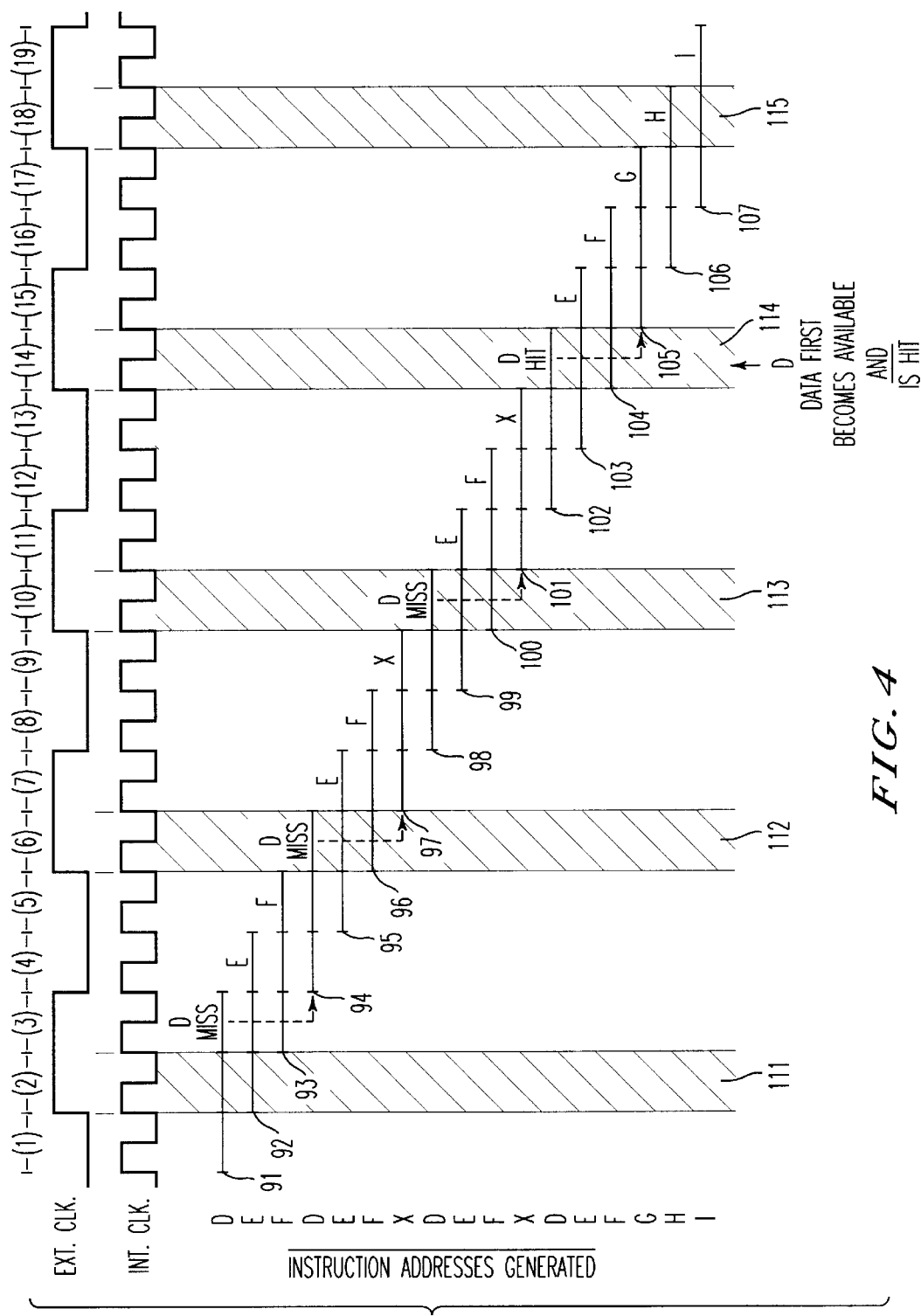
FIG. 4 is a timing diagram showing operation of another embodiment of address generation controlling logic of the instruction fetch block of FIG. 1.

Another example timing diagram is shown in FIG. 4, where the address generation is synchronized with the occurrence of the windows of opportunity. The result is to eliminate the internal clock cycle delays just described above. As with the example of FIG. 3, each address is calculated with the assumption that all the data requested by the previous address will be returned. Initial flows 91, 92 and 93 of FIG. 4 are the same as the initial flows 61, 62 and 63 of FIG. 3 in this regard. The address generation flows after a miss, however, are controlled quite differently. It has been recognized that only those flows after a miss that have their C cycles occurring in the same internal clock cycle as a window of opportunity matter, and that those flows should recalculate the missed address. Calculation of addresses in the flows after a miss are synchronized with the windows of opportunity so that the missing data is accessed in the same clock cycle that it is first made available from the system main memory.

In FIG. 4, the first flow to begin, in clock cycle (4), after a miss occurs in the immediately preceding clock cycle (3) in the flow 91, is the flow 94. Since the flow 94 has its C cycle occurring in a window of opportunity 112 during internal clock cycle (6), the missed address D is recalculated. In the next two flows 95 and 96, addresses E and F are calculated on the assumption that the data at address D will be returned in clock cycle (6) so that data at addresses E and F will then be accessed without any delay. But the flow 94 does not result in obtaining the data at address D, in this example, because the line fill process initiated by the cache 11 during clock cycle (4), after the miss occurs, has not yet retrieved the missed data from the main memory 33.

This second miss of the data at the address D is known when the next address generation flow 97 begins but since its C cycle occurs during clock cycle (9) before the next window of opportunity 113, it is not possible for the data at address D to be accessed by the flow 97. Since the instruction fetch operation example being described is limited to accessing instruction data in the order of its use by the processor, the flow 97 is of no use. Therefore, it does not matter what address is calculated by the flow 97, so it is indicated as an X. But practically, the next address D is likely to be calculated since additional address generation logic would be required to treat it differently. Of course, the generated addresses E, F and G in respective flows 95, 96 and 97 are ignored in response to the miss of address D by the flow 94.

It is the next flow 98 that regenerates the address D since its C cycle occurs in the same clock cycle (10) as the window of opportunity 113. If the data is made available during that window, it is accessed without delay. In the example shown, however, the data at address D has not yet been retrieved from the main memory 33 by the time of the window 113 so a miss again occurs. It is during the next window 114 that the data at address D is first made available. In the meantime, the flows 99–101 generate the same addresses as the flows 95–97 described above. But this time, regeneration of the address D in the flow 102 results in a hit in its C cycle and this accesses the data in the same internal clock cycle (14)

that the data is first made available. The possibility of up to the two cycle penalty of the example of FIG. 3 is eliminated. The flows 103–107 subsequent to the flow 102 each generate respective address E, F, G, H, I, etc., until another miss occurs, at which point the process described above is repeated for the missed address.

When the examples of FIGS. 3 and 4 are compared, it is noted that he initial flows 91–96 of FIG. 4 generate the same series of addresses as the initial flows 61–67. But there is a significant difference in the process. The flow 64 of FIG. 3 that begins the next clock cycle after a miss occurs in the flow 61 will always regenerate the address D. The flow 94 of FIG. 4, on the other hand, which begins the next clock cycle after a miss occurs in the flow 91, regenerates the address D only because its C cycle occurs during the same clock cycle (6) as the window of opportunity 112. There is this synchronism in the embodiment of FIG. 4 that does not exist in the embodiment of FIG. 3. The flows 97–99 of FIG. 4 do not automatically generate the respective addresses D–E, as do the respective flows 65, 67 and 68 of FIG. 3, in response to the miss. If they did, the address D would occur after the window of opportunity 112 and there would thus be a delay in accessing the data if it had first been made available during the window 112. The embodiment of FIG. 4 eliminates this potential delay so the data is accessed in the same internal clock cycle that it is made available from the main memory 33.

A typical line of cache data that is read in response to a single address is 4 quad words (32bytes). The width of the data path (bus) between the cache 11 (FIG. 1) and the main memory 33 is likely in most processor architectures to be much less than that, a single quad word (8 bytes) being an example. In this example, it takes 4 data read cycles of the main memory 33 to fill a line of the cache, and this takes at least 4 external clock cycles once the main memory data if first accessed. So long as data hits are being obtained, each new address is calculated by incrementing the prior address by the address space taken by the line of data that is expected to be returned by the prior address. When a miss occurs, however, it is preferred to access data being returned from the main memory 33 as soon as it is available rather than wait for a full line of the cache to be filled. Thus, the new addresses generated after a miss are preferably incremented an amount from the last address that is equal to the smallest width of the data path between the cache 11 and the main memory 33. In the timing diagram example of FIG. 4 and with such a processor architecture, the addresses generated by the flows beginning with the flow 94 would be incremented this lesser amount from the address of the prior flow. This would continue until the entire missed line(s) of data is accessed, at which point the addresses are again generated by incrementing the last address by one cache line worth of data.

In the example of FIG. 4, the number of cycles taken by the address generation pipeline to generate a new address, in that case 3, is less than the ratio of the internal to external clock frequencies, in that case 4. Implementation of the improved address generation algorithm changes somewhat when the reverse is true, namely when the number of internal clock cycles required to generate an address and check for a cache hit is greater than the clock ratio. An example of a 5 clock cycle address generator with a clock ratio of 4 is given in FIG. 6. When the number of cycles required to generate an address is equal to the clock ratio, the embodiment of FIG. 4 is utilized.

FIG. 5 illustrates operation of the three stage address generator of FIG. 2A in a situation when it takes five internal clock cycles to generate and check for a hit of an address. An increased number of internal clock cycles will be required when the time period of each clock cycle becomes so short that the work of one or more of the address pipeline stages cannot be completed in that time period. In this case, the address generation cycle $L_{NC}$ is completed in one clock cycle but each of the other two address generation cycles L and C each take two clock cycles to complete. The L cycle is denoted as being completed in two clock cycles $L_1$ and $L_2$. The C cycle takes two clock cycles $C_1$ and $C_2$.

Figure 6:
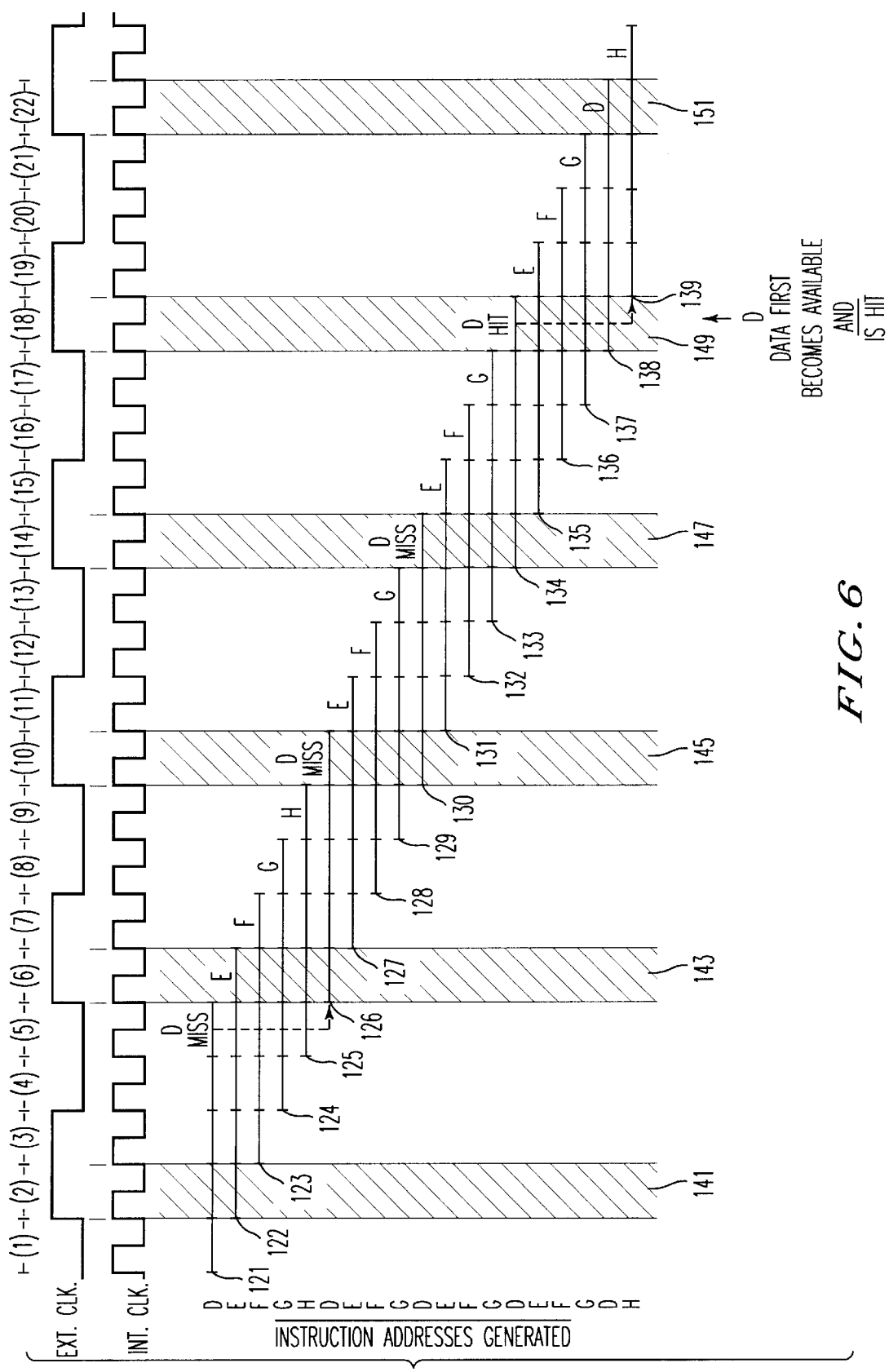
FIG. 6 is a timing diagram showing operation of a further embodiment of address generation controlling logic of the instruction fetch block of FIG. 1 when its pipeline operates as shown in FIG. 6.

In the example of FIG. 6, as with that of FIG. 4, the first flow 121 calculates the address D and it misses. Subsequent flows 122–125 generate the next addresses E, F, G and H in sequence since it is not known when their generation is started that the flow 121 will result in a miss. Each of the addresses E, F, G and H are generated by assuming that the preceding addresses will return the full amount of data addressed. But by the time that the flow 126 is begun, it is known that the address D generated by the flow 121 has missed. So the address D is regenerated in the next flow having its $C_2$ cycle within one of the subsequent windows of opportunity, which happens in this example to be the flow 126. If the timing of the flow 126 was different, it would be a later flow where the address D is regenerated to be applied to the cache 11 during a window of opportunity and the intermediate flow(s) would be of no effect, just like in the example of FIG. 4.

The address D generated by the flow 126 again misses since the data has not yet been retrieved from the main memory 33 by the time of the window of opportunity 145. Again, since it is not known whether the address D hit or not, subsequent flows 127, 128 and 129 generate the next sequence of addresses E, F and G, with the assumption that all the data previously addressed will be returned. But the flow 130 is treated differently in the embodiment of FIG. 6 than it would be in the embodiment of FIG. 4, because of the increased number of clock cycles required for generation of an address. Since it is not known by the beginning of the flow 130, in the clock cycle (10), whether the address D presented to the cache during the same clock cycle has hit or not, the algorithm could generate the next address H in order not to incur a penalty if the address D did hit. But since the flow 130 has its $C_2$ cycle occurring during the window of opportunity 147, the address D is regenerated before knowing whether a hit occurred. If the data at the address D were returned from the main memory 33 by the time of the window 147, any further clock cycle delays would be avoided.

In the example of FIG. 6, however, the address D again misses in clock cycle (14). In the meantime, addresses E, F and G are generated by flows 131, 132 and 133. Even though it is not know at the time the flow 134 begins whether the address D hit during the clock cycle (14), the address D is regenerated during that flow since its $C_2$ cycle occurs during the window 149. In this case, a hit results in the clock cycle (18). In the meantime, flows 135, 136 and 137 have begun to generate the next sequential addresses E, F and G, as before. When the flow 138 begins, it is not known whether there was a hit or not from the flow 134, so the address D is regenerated since its $C_2$ cycle occurs during the window of opportunity 151 as before. In this case, however, a hit of address D occurs during the window 149. By the beginning of the next flow 139, this is known, resulting in the address H being generated and the address D regenerated by the flow 138 is ignored. Subsequent flows (not shown) then generate addresses I, J, K, etc., in order, until another miss is encountered, at which time the process of FIG. 6 is repeated.

A one cycle penalty results from the flow 138 recalculating the address D when it is not necessary to do so. It could have been predicted that a hit would occur and calculated the next address H instead. But even though that prediction would have saved one cycle when a hit occurs, use of that prediction for earlier flows would have resulted in a penalty of up to 3 internal clock cycles, depending upon the timing. The address generated by the flow 134 with that prediction, for example, would be H instead of the address D actually generated. This would result in not having the address D generated during the window 149 but rather would be a clock cycle later, and could be up to 3 clock cycles later with other timing.

Each of the embodiments described with respect to the timing diagrams of FIGS. 4 and 6 generate a sequence of addresses according to a common guiding principle. After it is known that a miss has occurred, the missed address is regenerated in each flow thereafter that has its C (or $C_2$) cycle occurring coincident with a window of opportunity until it is known that the missed address finally hit. After it is known that the missed address finally hit, the address generation algorithm returns to using the prediction that each address will return the full amount of data requested.

Although the present invention has been described in terms of its preferred embodiments, it is to be understood that the invention is entitled to protection within the full scope of the appended claims.

It is claimed:

1. A method of addressing a cache memory operating as part of a processing system including a processor and main memory, comprising:

in an operating cycle when one address is being applied to the cache memory, calculating a next address by incrementing the one address a full amount corresponding to amount of data that the one address can return before it is known whether such full amount of data is actually returned, and in response to the full amount of data not being returned, accessing said data in the main memory, ignoring the next address and recalculating the one address for accessing said data after being read from the main memory.

2. The method of claim 1, wherein the one address is recalculated in synchronism with its data from the main memory first becoming available to the processor.

3. The method of claim 2, wherein the cache memory and processor operate at a first clock frequency and the main memory operates at a second clock frequency less than the first clock frequency, the data returned from the main memory being accessed during one of periodically recurring cycles of the second clock.

4. The method of claim 3, wherein a ratio of the first clock frequency to the second clock frequency is an integer greater than one.

5. The method of claim 1, wherein the amount of data accessible in parallel from the main memory is a first amount, the data accessible in parallel from the cache a second amount, the second amount being greater than the first amount, the next address being calculated by incrementing the one address an amount corresponding to the second amount of data, and in response to the full amount of data not being returned from the cache, accessing said data in the main memory by calculating a succession of addresses that are incremented from one another by amounts corresponding to the second amount of data.

6. A method of addressing a cache memory operating at a first clock frequency and as part of a processor system that also includes main memory accessible at a second clock frequency, a ratio of the first clock frequency to the second clock frequency being an integer greater than one, comprising:

in an operating cycle when one address is being applied to the cache memory, calculating a next address by assuming a full amount of the data that the one address can return will be read out of the cache memory before it is known whether such full amount of data is actually returned, and in response to the full amount of data not being returned because they are not in the cache memory, accessing said data in the main memory, ignoring the next address and recalculating the one address to be available simultaneously with one of periodically occurring cycles of the first clock when the non-returned data first becomes available from the main memory.

7. A method of addressing a cache memory operating at a first clock frequency and as part of a processor system that also includes main memory accessible at a second clock frequency, a ratio of the first clock frequency to the second clock frequency being an integer greater than one, comprising:

employing a multiple stage pipeline address generator that includes at least address calculation and address issuing stages wherein one address is being applied by the issue stage to the cache memory to read out data at said one address into a buffer memory while a next successive address is being calculated in the calculation stage, the cache memory providing a miss signal if data do not exist at the applied address, identifying intervals during which data missing from the cache can first be made available from the main memory for writing into the buffer memory, and causing the address generator to recalculate an address previously applied to the cache memory and which resulted in a data miss signal and reissue the recalculated address coincident with data availability intervals thereafter until the missing data is written into the buffer memory, thereby to write the missing data into the buffer memory at the earliest possible time.

8. A data processor, comprising:

a cache memory characterized by issuing a data miss signal when the cache memory does not contain data at an address applied to the cache memory, a first clock signal connected to operate the cache memory in a first succession of defined intervals, an instruction data buffer memory, an address generator responsive to the first clock signal that includes a plurality of stages connected in a pipeline such that a first address is calculated during one of the first intervals, the first address is issued to the cache memory during a successive one of the first intervals to cause data at the first address to be written into the buffer memory, and a second address is calculated during the successive one of the first intervals, a main memory, a second clock signal connected to operate the main memory in a second succession of defined intervals that are individually longer than the first defined intervals, address generator logic responsive to a ratio of the first and second defined intervals and the data miss signal from the cache to recalculate an address previously applied to the cache memory that resulted in a data miss signal and reissue the recalculated address coincident with periodic ones of the first succession of defined intervals during which data is first made available from the main memory until the missing data is written into the buffer memory.

* * * * *